(12) United States Patent
Jeon et al.

(10) Patent No.: US 10,009,907 B2
(45) Date of Patent: Jun. 26, 2018

(54) METHOD AND APPARATUS FOR OPERATING UPLINK AMC IN MOBILE COMMUNICATION SYSTEM

(71) Applicant: Samsung Electronics Co., Ltd., Gyeonggi-do (KR)

(72) Inventors: Younghyun Jeon, Gyeonggi-do (KR); Seunghun Jang, Seoul (KR); Chungryul Chang, Gyeonggi-do (KR); Neunghyung Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 196 days.

(21) Appl. No.: 14/759,861

(22) PCT Filed: Jan. 8, 2014

(86) PCT No.: PCT/KR2014/000208
§ 371 (c)(1),
(2) Date: Jul. 8, 2015

(87) PCT Pub. No.: WO2014/109549
PCT Pub. Date: Jul. 17, 2014

(65) Prior Publication Data
US 2015/0358982 A1    Dec. 10, 2015

(30) Foreign Application Priority Data
Jan. 8, 2013 (KR) .................. 10-2013-0001889

(51) Int. Cl.
*H04W 72/08* (2009.01)
*H04L 1/20* (2006.01)
(Continued)

(52) U.S. Cl.
CPC ......... *H04W 72/085* (2013.01); *H04J 11/005* (2013.01); *H04J 11/0053* (2013.01);
(Continued)

(58) Field of Classification Search
CPC ... H04W 72/085; H04W 24/00; H04W 72/08; H04J 11/005; H04J 11/0053;
(Continued)

(56) References Cited

U.S. PATENT DOCUMENTS

2008/0159192 A1* 7/2008 Lee ...................... H04L 1/0003
370/310
2009/0323641 A1   12/2009 Futagi et al.
(Continued)

FOREIGN PATENT DOCUMENTS

| KR | 1020070063850 | 6/2007 |
| KR | 1020110020848 | 3/2011 |
| KR | 1020110035807 | 4/2011 |

OTHER PUBLICATIONS

PCT/ISA/237 Written Opinion issued on PCT/KR2014/000208 (pp. 5).
PCT/ISA/210 Search Report issued on PCT/KR2014/000208 (pp. 3).

*Primary Examiner* — Scott M Sciacca
(74) *Attorney, Agent, or Firm* — The Farrell Law Firm, P.C.

(57) ABSTRACT

A method for a serving base station determining a modulation and coding selection (MCS) of a terminal in a wireless communication system, according to the present invention, comprises the steps of: determining uplink interference from neighboring cells; determining a signal-to-interference plus noise ratio (SINR) based on a reply signal indicating whether data transmitted by the terminal is successfully received and the interference information; and determining the MCS based on the SINR information and the reply signal. According to the present invention, an MCS level can be determined according to a channel status of a receiver by accurately determining interference from nearby cells, thereby improving data transmission/reception efficiency.

10 Claims, 15 Drawing Sheets

(51) Int. Cl.
*H04L 1/00* (2006.01)
*H04J 11/00* (2006.01)

(52) U.S. Cl.
CPC .......... *H04L 1/0003* (2013.01); *H04L 1/0009* (2013.01); *H04L 1/0026* (2013.01); *H04L 1/0034* (2013.01); *H04W 72/08* (2013.01)

(58) Field of Classification Search
CPC ... H04L 1/0003; H04L 1/0009; H04L 1/0026; H04L 1/0034; H04L 5/0035; H04L 5/0073
USPC ........................................................ 370/252
See application file for complete search history.

(56) References Cited

U.S. PATENT DOCUMENTS

| | | | |
|---|---|---|---|
| 2012/0099546 A1 | 4/2012 | Cho et al. | |
| 2012/0287813 A1* | 11/2012 | Alm | H04L 1/0003 370/252 |
| 2012/0289275 A1 | 11/2012 | Li et al. | |
| 2013/0121186 A1* | 5/2013 | Vajapeyam | H04W 72/085 370/252 |
| 2013/0188576 A1* | 7/2013 | Chao | H04L 47/00 370/329 |
| 2013/0195053 A1* | 8/2013 | Jeon | H04W 72/0406 370/329 |
| 2013/0344909 A1* | 12/2013 | Davydov | H04B 7/0689 455/501 |
| 2014/0011535 A1* | 1/2014 | Jeon | H04W 52/40 455/522 |

* cited by examiner

METHOD AND APPARATUS FOR OPERATING UPLINK AMC IN MOBILE COMMUNICATION SYSTEM

TECHNICAL FIELD

The present invention relates to a method and an apparatus for transmitting data in a wireless communication system, and more particularly, to a method and an apparatus for operating uplink adaptive modulation and coding (AMC).

Particularly, the present invention relates to a method for effectively determining a modulation and coding selection (MCS) scheme of a mobile station, based on inter-cell interference information according to cooperative transmission of base stations in a coordinated multi-point (CoMP) transmission-based system, in which a plurality of nearby cells/base stations that have a plurality of antennas cooperatively communicate with each other.

BACKGROUND ART

Typical wireless communication systems adopt resource scheduling technology in order to effectively use limited wireless resources. The resource scheduling technology adopted in the wireless communication system includes resource allocation according to the transmission direction of data, resource allocation considering the reuse efficiency, or the like.

The resource allocation according to the data transmission direction may include allocation of resources for a downlink from a base station to a wireless terminal (hereinafter, referred to as "downlink resources"), and allocation of resources for an uplink from the wireless terminal to the base station (hereinafter, referred to as "uplink resources"). In addition, the resource allocation considering the reuse efficiency means resource allocation in its own service area by considering interference with respect to nearby service areas.

The typical wireless communication system adopts an adaptive modulation and coding (AMC) scheme and a channel sensitive scheduling scheme in order to effectively allocate the wireless resources and improve the transmission efficiency.

The AMC scheme refers to technology in which the amount of transmission data is adjusted according to the channel status in order to transmit a lot of information while maintaining the reception error probability at a desired level. According to this, scheduling for reducing or increasing the amount of transmission data in response to the channel status may be provided.

The channel sensitive scheduling scheme refers to technology in which a user in a good channel status is selectively served among a plurality of users. The channel sensitive scheduling scheme may selectively provide a service to a user in a good channel status among a plurality of users to relatively increase the system capacity. Such an increase in the system capacity is called a "multi-user diversity gain."

In other words, according to the AMC scheme and the channel sensitive scheduling scheme, by receiving feedback about partial channel quality information (CQI) from a receiver, transmission/reception information between selected terminals and base stations is allocated to limited wireless resources at a time determined to be most effective, and the resources allocated to the terminals are applied with a proper modulation and coding scheme.

Meanwhile, vibrant studies about broadband wireless communication systems, such as LTE Release 8/9, are in progress. In the broadband wireless communication system, the modulation scheme of transmission data and the coding rate of error correcting codes may be determined to be suitable for the channel environment before the data is transmitted.

The modulation and coding scheme (MCS) level for the downlink or uplink transmission of the broadband wireless communication system may be implemented in various ways, and typically, it may be determined in the following manner.

In the case of the downlink, when channel quality information and a reply signal to downlink data, i.e., acknowledgement (ACK)/negative acknowledgement (NACK) signal, are received from the terminal, the base station may determine the channel status of the terminal on the basis of the channel quality information and the ACK/NACK signal. In addition, the base station may detect an MCS level corresponding to the determined channel status with reference to an MCS determination table including predetermined MCS level information according to the channel status. Next, the base station may transmit downlink data to the terminal using the detected MCS level.

Although the uplink may be implemented in various ways, typically, the base station may receive uplink channel quality information {sounding reference signal (SRS)} from the terminal, and may measure an SRS-based SINR from the average interference-over-thermal (IoT) of PUSCH of each cell. In addition, the base station may receive a reply signal to uplink data, i.e., an acknowledgement (ACK)/negative acknowledgement (NACK) signal, and may determine the channel status of the terminal on the basis of the channel quality information (the SRS-based SINR) and the ACK/NACK signal.

In addition, the base station may detect an MCS level corresponding to the determined channel status with reference to an MCS determination table including predetermined MCS level information according to the channel status. Next, the base station may transmit downlink data to the terminal using the detected MCS level.

Alternatively, in the case of the uplink, the channel status of the terminal may be estimated based on only the reply signal to the uplink data, i.e., the ACK/NACK signal, without considering separate uplink channel information, and the MCS level corresponding to the determined channel status of the terminal may be detected with reference to the MCS determination table including predetermined MCS level information according to the channel status.

As mentioned above, according to the prior art, the base station determines the MCS only by interference information measured in each cell, uplink pilot strength information received from the terminal, and the ACK information without considering interference of the actual terminal channel environment.

A difference of the methods for determining MCS between the downlink and the uplink stems from the fact that the interference of the downlink can be preliminarily estimated because the terminal directly measures the interference and reports the same in the channel quality information to the base station, whereas the interference of the uplink cannot be estimated because interference signal sources, which are dynamically changed, cannot be accurately recognized in the uplink.

Particularly, in the case of the uplink, the terminal allocated with the resource in the neighboring cell varies dynamically, so the interference signal source is not fixed.

Therefore, it is impossible to estimate an optimal MCS on the basis of real time SINR information, so two MCS determination methods may be applied for implementation.

That is, the MCS level is determined by referring to interference strength information that is averaged in a cell unit in order to determine the SRS-based SINR information, which is referred to in determining the MCS, or by estimating the channel quality only through the ACK/NACK determination in a receiver without the help of the SRS-based SINR information.

In this case, since an adaptive modulation and coding (AMC) determining unit determines the MCS level by considering only limited channel quality information and limited (not real time/not in a UE unit) interference information, which is averaged in a cell unit, in estimating the MCS, the uplink frequency efficiency becomes quite low, compared with the downlink.

Because an actual interference signal source dynamically changes a lot according to the scheduling result of the nearby (neighboring) cells, whereas since an interference estimated value relies on a cell-specific average expected value, the channel quality information just depends on the ACK/NACK information, and the open-loop rate control (OLRC) is inefficiently operated without an accurate reference so that the uplink frequency efficiency may be lowered.

According to the conventional AMC determination method, the AMC_SINR is determined in accordance with the cell-specific average expected value.

Meanwhile, the CoMP standard, which is under discussion as a study-item or a work-item in the LTE-Advance system after the LTE system, plans to introduce the coordinated multi-point (CoMP) transmission/reception technology or the multi-cell multiple input multiple output (MIMO) technology, in which neighboring cells cooperate with each other by considering the instant channel and traffic situation of the terminal located in the cell-boundary (hereinafter, referred to as a boundary terminal).

According to the downlink method of the coordinated scheduling/coordinated beamforming (CS/CB) CoMP among the CoMP technologies, when a plurality of base stations (BS) communicate with the terminals through antenna beamforming, the terminal may select the antenna beamforming of the base station to thereby increase the capacity of the boundary terminal.

At this time, each terminal may select the antenna beamforming of each base station such that the signal of a serving base station becomes a maximum value, and the interference signal from the nearby base stations is a minimum value. Here, the CS/CB CoMP cooperative base stations transmit data to only its own terminals rather than the terminals in the neighboring cooperative cells.

The CoMP technology requires a lot of information, which is to be transmitted through the backhaul for the cooperation of the base stations, and complicated scheduling and CoMP signal processing calculation for the resource allocation. However, since the CoMP technology has an advantage of raising the cell boundary and cell average capacity compared to the ICIC technology, it is spotlighted as the cell cooperative scheduling technology with reduced implementation complexity.

The inter-cell cooperative scheduling technology, which can be implemented in the uplink, may exemplify the technology in which the terminals are separated as interfering/non-interfering UEs using long-term channel strength information in each terminal, and inter-cell cooperative scheduling of an interference-coordination function is performed. In the uplink system, if such an advanced inter-cell cooperative scheduling introduces the effective MCS estimation method based on the real time interference, in addition to the benefit of the inter-cell cooperative scheduling, the inefficient uplink MCS determination method can be improved to considerably enhance the uplink frequency efficiency.

In the uplink system, if the advanced inter-cell cooperative scheduling does not introduce the effective MCS estimation method based on the real time interference, the inefficient uplink MCS determination method may not be improved and there may be a limit in enhancing the uplink frequency efficiency.

DETAILED DESCRIPTION OF THE INVENTION

Technical Problem

The present invention provides a method and an apparatus for transmitting data through the uplink in a wireless communication system. More specifically, the present invention provides a method and an apparatus by which an MCS level suitable for the real time uplink interference strength and the channel situation for uplink data transmission by estimating the uplink real time interference strength in the case where real time scheduling information can be shared between neighboring (nearby) cells using an interface (an optical fiber) between the base stations, which enables coordinated scheduling (CS) of the CoMP in a wireless communication system.

Furthermore, the present invention provides a method and an apparatus, which can improve the data transmission efficiency using the MCS level corresponding to the channel status of a receiver considering interference in a wireless communication system.

Technical Solution

In order to address the problems above, a method for a serving base station determining a modulation and coding selection (MCS) of a terminal in a wireless communication uplink system may include: determining uplink interference from neighboring cells; determining a signal-to-interference plus noise ratio (SINR), based on a reply signal indicating whether or not data transmitted by the terminal is successfully received, and the interference information; and determining the MCS, based on the SINR information and the reply signal.

In accordance with another aspect of the present invention, a serving base station for determining a modulation and coding selection (MCS) of a terminal in a wireless communication uplink system may include: a transmitting/receiving unit that transmits/receives signals to/from neighboring cells; and a controller that determines uplink interference from neighboring cells, determines a signal-to-interference plus noise ratio (SINR), based on a reply signal indicating whether or not data transmitted by the terminal is successfully received, and the interference information, and determines the MCS, based on the SINR information and the reply signal.

Advantageous Effects

According to the present invention, the channel status of a receiver in a wireless communication system can be accurately determined according to the uplink interference. Furthermore, according to the present invention, the MCS level can be determined according to the channel status of the receiver by accurately determining the interference to thereby improve the data transmission efficiency.

In addition, according to the present invention, benefits can be expected through the cooperative-AMC in terms of the cell coverage as well as the capacity of the terminal.

MODE FOR CARRYING OUT THE INVENTION

Hereinafter, preferred embodiments of the present invention will be described in detail with reference to the accompanying drawings. Further, in the following description of the present disclosure, a detailed description of known functions and configurations incorporated herein will be omitted when it may make the subject matter of the present disclosure rather unclear.

In the present invention, it is assumed that real time scheduling information or preliminary scheduling information of nearby (neighboring) cells can be shared using an interface (an optical fiber) between base stations, which enables coordinated scheduling (CS) of the CoMP in a wireless communication system. The present invention provides a method and an apparatus in which a transmitter (a terminal) transmits data to a receiver (a base station) in an uplink system of wireless communication, and estimates SINR information on the basis of a reply signal indicating the successful reception of the data and uplink interference strength information shared from cooperative cells so that data is transmitted to the receiver using a modulation and coding scheme (MCS) corresponding to channel quality information considering the interference on the basis of the estimated SINR information on the channel and the reply signal.

Hereinafter, the description will be made of an embodiment in which the transmitter is a terminal and the receiver is a base station.

Figure 1:
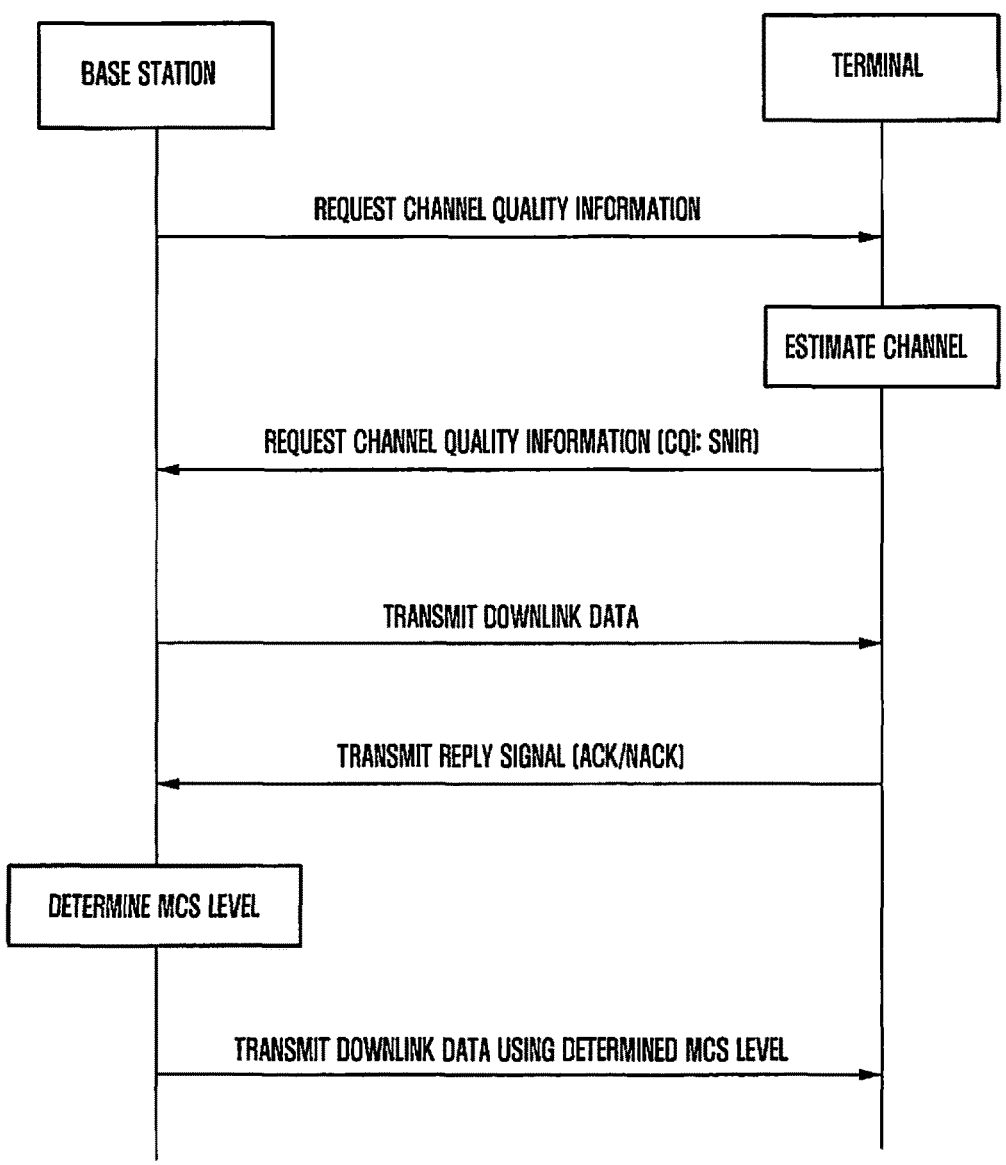
FIG. 1 is a signal flowchart illustrating a downlink data transmission method in the conventional wireless communication system.

Prior to explaining the embodiment of the present invention, a data transmission method and an apparatus thereof in the conventional wireless communication system will be described. FIG. 1 is a signal flowchart illustrating a downlink data transmission method in the conventional wireless communication system.

Referring to FIG. 1, a base station makes a request to a terminal for channel quality information. Then, the terminal estimates a channel using a pilot signal or a preamble signal, which are transmitted from the base station, and transmits the channel quality information including status information on the estimated channel to the base station.

The channel quality information (CQI) may include a channel coefficient or a carrier-to-interference plus noise ratio (SINR). In general, the channel quality information includes the SINR in consideration of the system complexity.

The base station transmits downlink data to the terminal, and receives a reply signal in response to the transmitted downlink data, i.e., an acknowledgement (ACK)/negative acknowledgement (NACK) signal.

In addition, the base station determines an MCS level on the basis of the received SINR and the ACK/NACK signal, and transmits downlink data to the terminal using the determined MCS level.

Now, the detailed description of the MCS determining operation will be made as follows. The base station determines the MCS level with reference to an MCS determination table predetermined using the SINR. However, the MCS determination table cannot reflect all of the channel environments for actual operation of the wireless communication system.

Therefore, the base station uses an adaptive channel quality information adjustment scheme {hereinafter, referred to as an "outer-loop rate control (OLRC) scheme"}. The OLRC scheme refers to a scheme by which the base station modifies the SINR value received from the terminal using the ACK/NACK signal received from the terminal.

More specifically, when the ACK signal is received after transmitting the downlink data, the base station modifies the SINR value using Equation 1 below. In addition, when the NACK signal is received after transmitting the downlink data, the base station modifies the SINR value using Equation 2 below.

$$\text{SINR\_Out} = \text{SINR\_in} + \textit{Offset}_k, \quad \text{Equation 1}$$
$$\text{where } \textit{Offset}_k = \textit{Offset}_k + \text{Up},$$
$$\text{where } \text{Up} = \text{Down} \times \frac{\text{Target\_PER}}{1 - \text{Target\_PER}}$$

$$\text{SINR\_Out} = \text{SINR\_in} + \textit{Offset}_k, \quad \text{Equation 2}$$
$$\text{where } \textit{Offset}_k = \textit{Offset}_k - \text{Down},$$
$$\text{where } \text{Up} = \text{Down} \times \frac{\text{Target\_PER}}{1 - \text{Target\_PER}}$$

In Equation 1 and 2, SINR_in refers to the SINR value received from the terminal, and SINR_out refers to the modified SINR value. Target PER stands for a target packet error rate. Offsetk−1 denotes an offset value used for modifying SINR_in at a time of k−1, and Offsetk denotes an offset value used for modifying SINR_in at a time of k. In addition, DOWN refers to a predetermined value, and UP is a value determined based on DOWN and Target PER.

As shown in Equation 1 and Equation 2, when the ACK signal is received from the terminal, the base station increases SINR-in by UP, and when the NACK signal is received from the terminal, the base station reduces SINR_in by DOWN.

When the SINR value is modified as mentioned above, the base station determines an MCS level corresponding to the changed SINR value, and transmits the downlink data to the terminal using the determined MCS level.

Figure 2:
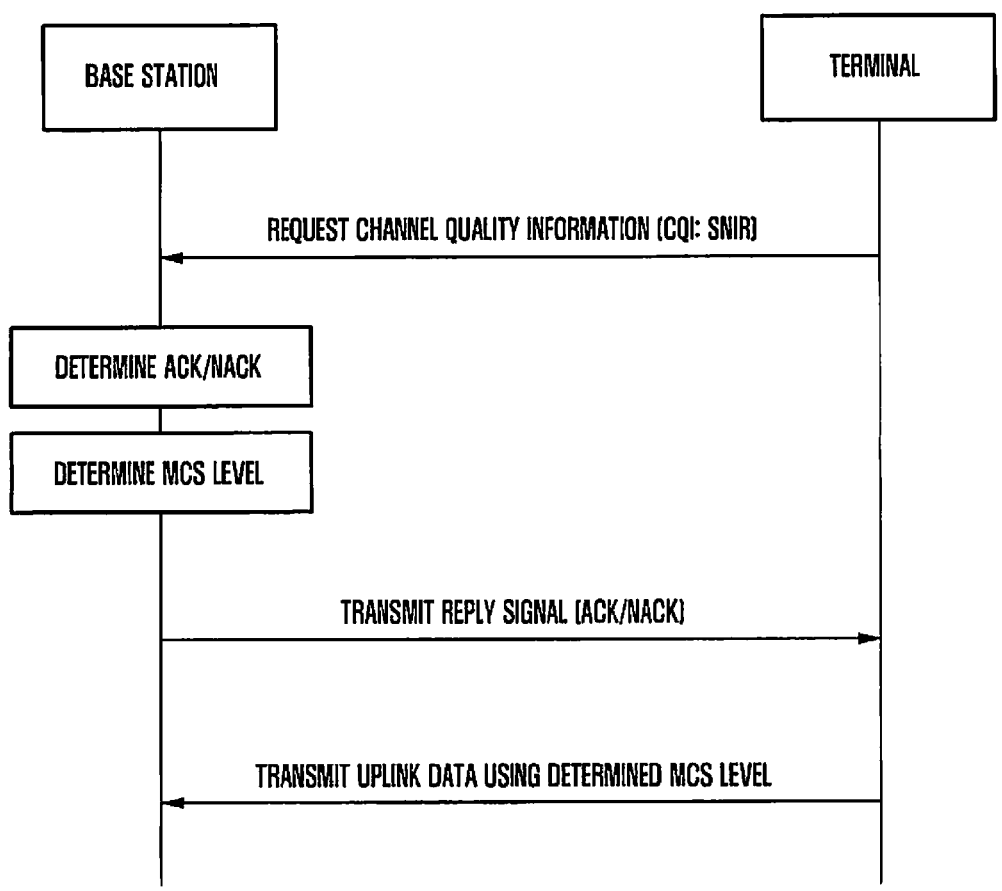
FIG. 2 is a signal flowchart illustrating an uplink data transmission method in the conventional wireless communication system.

FIG. 2 is a signal flowchart illustrating an uplink data transmission method in the conventional wireless communication system. Unlike the downlink interference, it is difficult to estimate the uplink interference in the conventional system. Therefore, the base station receives a reply signal in response to the transmitted uplink data, i.e., an acknowledgement (ACK)/negative acknowledgement (NACK) signal, from the terminal without estimating the SINR of the channel status.

In addition, the base station determines the MCS level based on the received ACK/NACK signal in response to the uplink data, and transmits the uplink data to the terminal using the determined MCS level.

Figure 3:
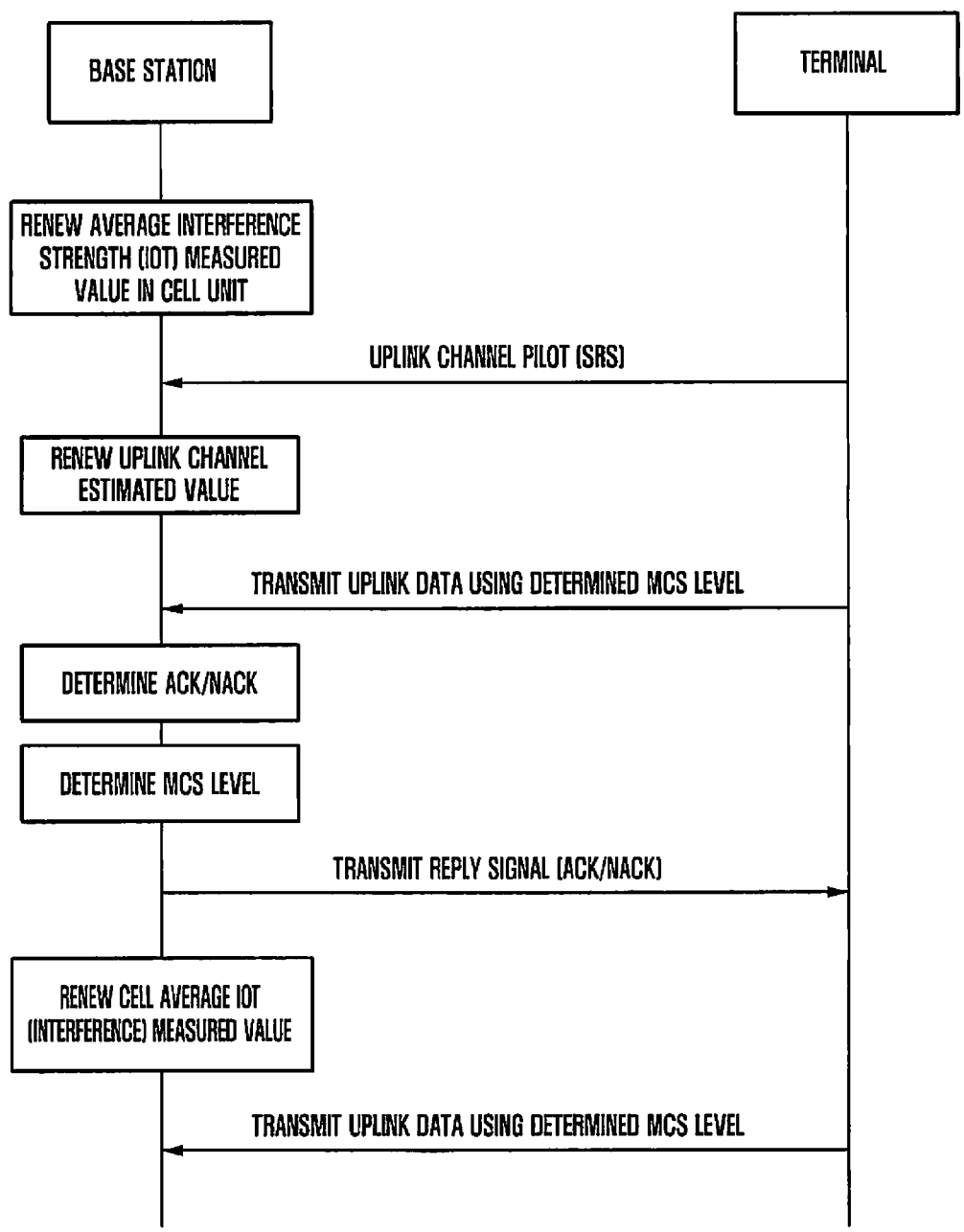
FIG. 3 is a signal flowchart illustrating an uplink data transmission method in the conventional wireless communication system.

FIG. 3 is a signal flowchart illustrating an uplink data transmission method in the conventional wireless communication system.

As shown in FIG. 3, the base station renews an average interference strength measured value in a cell unit, and receives an uplink channel pilot (SRS) signal from the terminal. An uplink channel estimated value is renewed using the same.

Next, the base station receives the uplink data from the terminal using the determined MCS level. Then, the base station determines the ACK/NACK, and determines the MCS level to transmit the ACK/NACK to the terminal.

Afterwards, the base station renews the cell average interference measured value, and repeats the reception of the uplink data using the determined MCS level.

Figure 4:
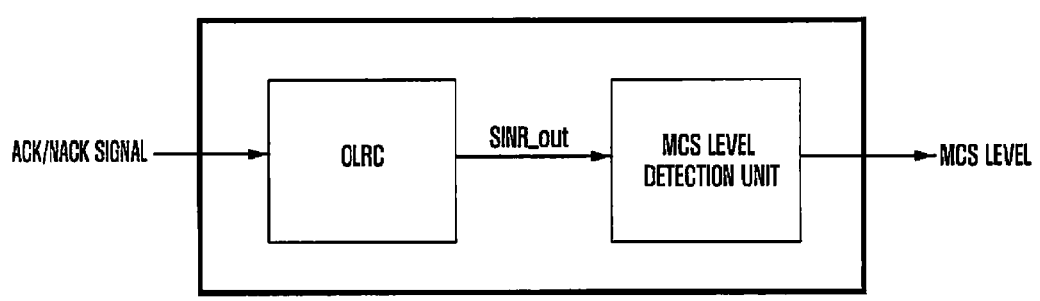
FIG. 4 is a block diagram of an uplink MCS level determining unit included in a base station in the conventional wireless communication system.

FIG. 4 is a block diagram of an uplink MCS level determining unit included in a base station in the conventional wireless communication system.

As shown in FIG. 4, the base station, according to the prior art, may receive channel quality information and a reply signal in response to the downlink data, i.e., an acknowledgement (ACK)/negative acknowledgement (NACK) signal, and may detect the MCS level on the basis of the same. In this case, the base station may estimate the channel quality only through the determination on the ACK/NACK at a receiver without the help of the SRS-based SINR information to thereby determine the MCS level.

Figure 5:
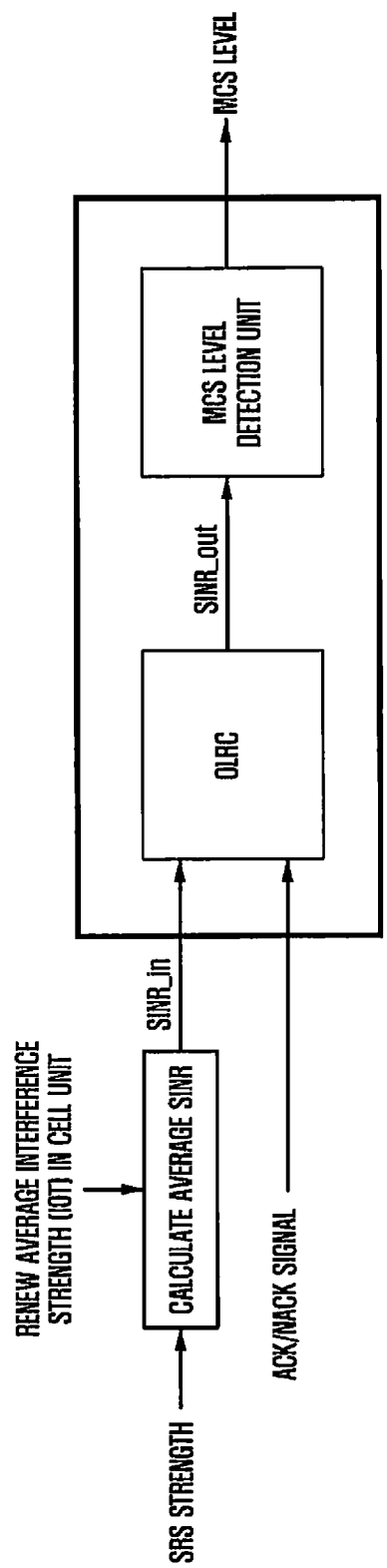
FIG. 5 is a block diagram of an uplink MCS level determining unit included in a base station in the conventional wireless communication system.

FIG. 5 is another block diagram of an uplink MCS level determining unit included in a base station in the conventional wireless communication system.

As illustrated in FIG. 5, the base station, according to the prior art, may receive uplink channel quality information {a sounding reference signal (SRS)} and average interference-over-thermal (IoT) information of each cell PUSCH from the terminal to thereby measure the SRS-based SINR. In addition, the base station may receive a reply signal in response to the uplink data, i.e., an acknowledgement (ACK)/negative acknowledgement (NACK) signal, and may determine the channel status of the terminal on the basis of the channel quality information (the SRS-based SINR) and the ACK/NACK signal.

Figure 6A:
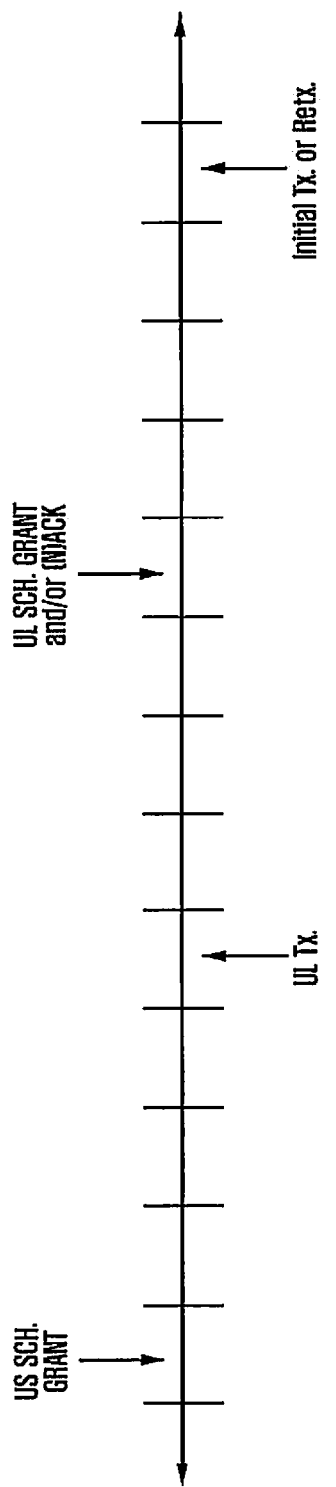
FIG. 6a illustrates data transmitting/re-transmitting operation of resource allocation according to the prior art.

FIG. 6a illustrates data transmitting/re-transmitting operation of resource allocation according to the prior art.

As shown in FIG. 6a, the data transmitting/re-transmitting operation, according to the prior art, is performed in a four-frame unit. That is, the base station may allocate the uplink resource to the terminal, and may receive an uplink channel from the terminal in four frames. In addition, base station may transmit an ACK/NACK signal in response thereto to the terminal in four frames, and in the case of transmitting the NACK signal, the base station may receive data re-transmitted from the terminal in four frames.

Figure 6B:
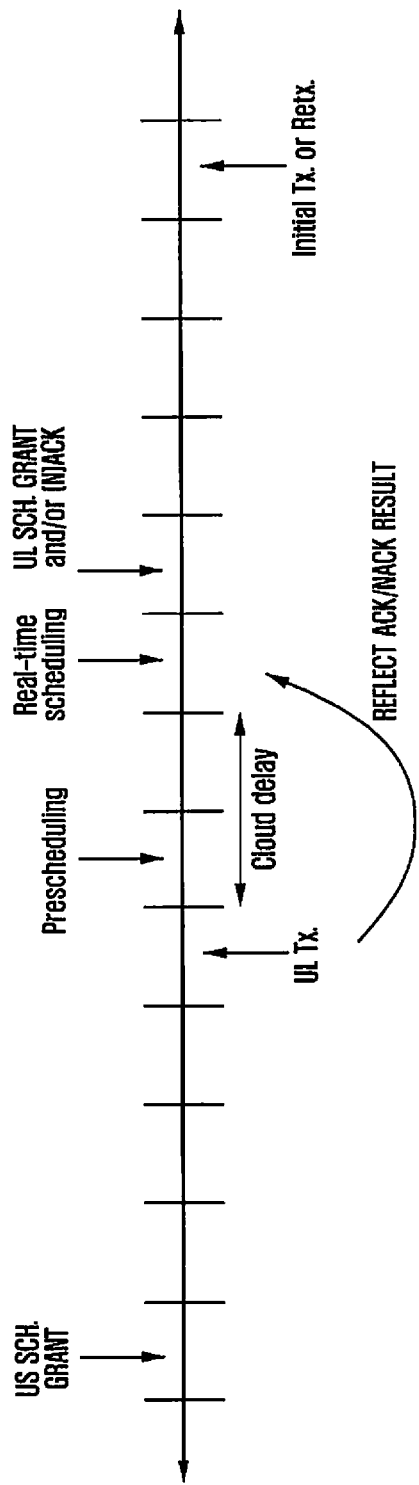
FIG. 6b illustrates data transmitting/re-transmitting operation of resource allocation according to an embodiment of the present invention.

FIG. 6b illustrates data transmitting/re-transmitting operation of resource allocation according to an embodiment of the present invention.

The present invention relates to one of coordinated scheduling (CS) or cooperative scheduling methods among the CoMP technologies. According to an embodiment of the present invention, as shown in FIG. 6a, by using resource allocation information of pre-scheduling information, which is distributedly/independently conducted by a scheduler of each base station, the real time interference strength of the uplink from cooperative cells may be estimated, and an MCS level may be determined to be suitable for the real time uplink interference strength and the channel status for the uplink data transmission.

Figure 7:
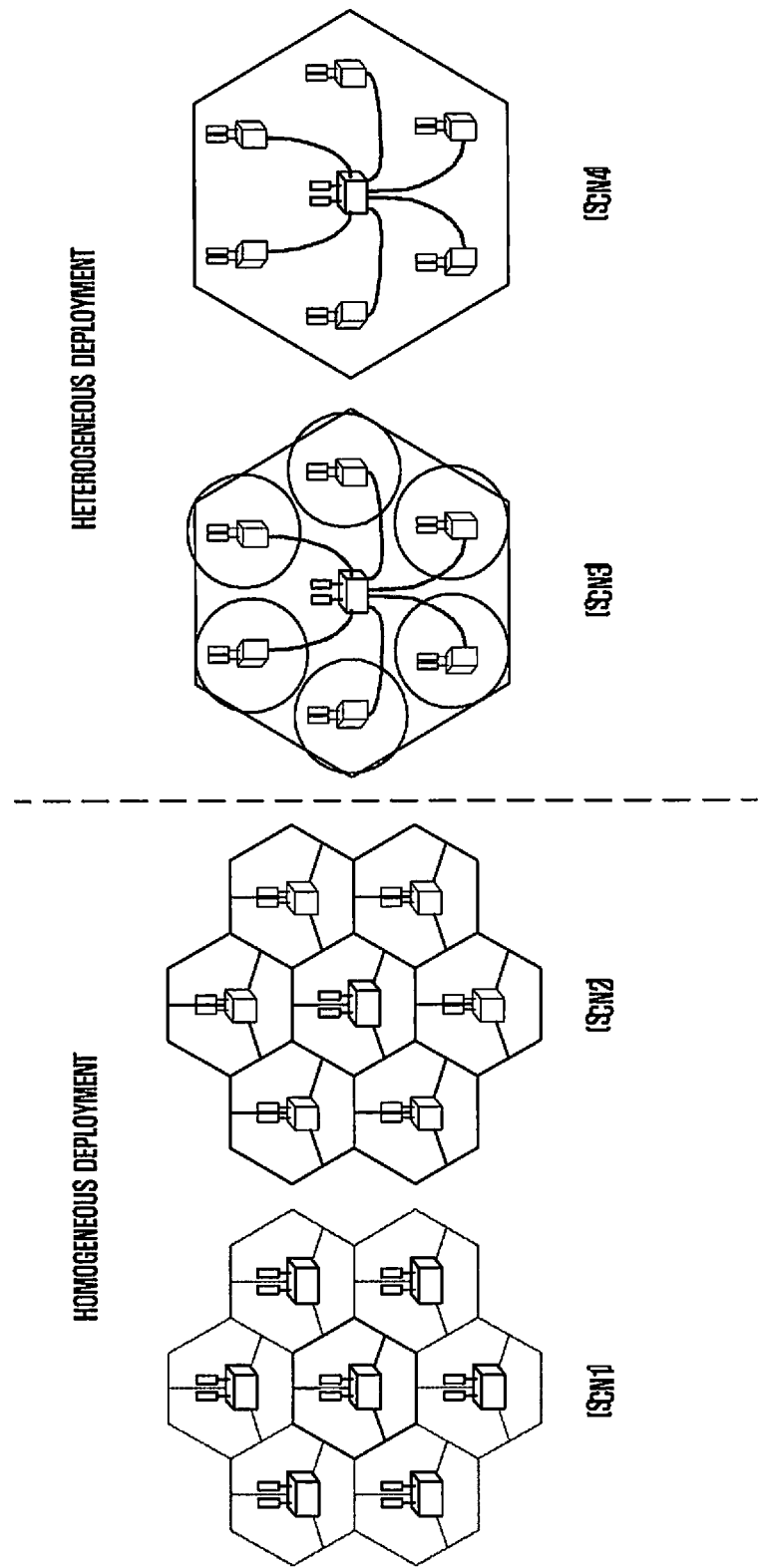
FIG. 7 is a diagram to explain CoMP scenarios discussed in the LTE standard.

FIG. 7 is a diagram to explain CoMP scenarios discussed in the LTE standard. The first scenario is the intra-eNB CoMP in homogeneous deployment, and the second scenario is the inter-eNB CoMP in homogeneous deployment. The third scenario is the inter-cell CoMP in heterogeneous deployment, and the fourth scenario is the distributed antenna system with shared cell ID.

According to the fourth scenario, each base station may share a control channel (PDCCH/PUCCH) including the CRS or the resource allocation information, and may spatially separate the data channel (PUSCH/PDSCH) for use. According to this, the error rate of the control channel in a cell edge area can be reduced, and the data channel capacity can be enhanced using the MIMO or the space-division multiple access (SDMA) scheme.

Figure 8:
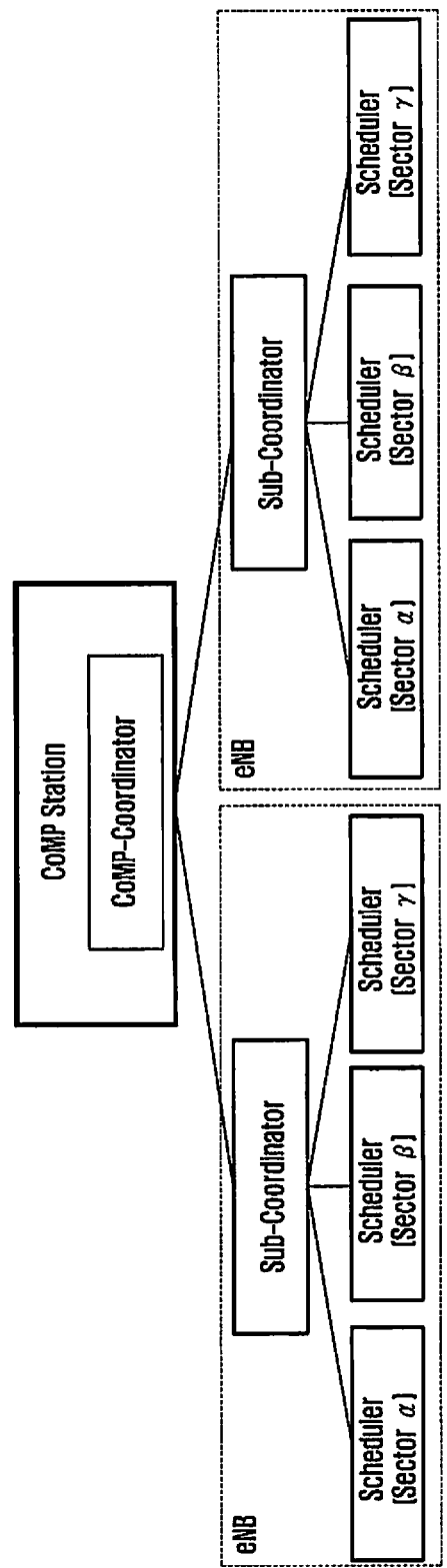
FIG. 8 is a diagram to explain an interface between base stations corresponding to CoMP scenarios 1 and 2.

FIG. 8 is a diagram to explain an interface between the base stations corresponding to the CoMP scenarios 1 and 2. The CoMP scenario 1 refers to the intra-eNB CoMP in homogeneous deployment, and the scenario 2 refers to the inter-eNB CoMP in homogeneous deployment.

As shown in FIG. 8, the present invention operates based on the structure comprised of a "scheduler," a "sub-coordinator" that manages and controls the "scheduler," and a "CoMP-coordinator" that manages and controls the "sub-coordinator."

The "sub-coordinator" may perform cooperative scheduling between peripheral macro-cells corresponding to sectors α, β, and γ, which are subordinate to the local eNB, and may make the relationship of master-slave with the CoMP-coordinator in the network, wherein the sub-coordinator corresponds to a slave, and the "CoMP-coordinator" corresponds to a master.

When minor information is uploaded by the "sub-coordinator" in the eNB, the "CoMP-coordinator" may share and adjust the inter-cell cooperative scheduling information of the "sub-coordinator," and may provide the inter-cell cooperative scheduling information.

The scheduler, which is subordinate to the sub-coordinator, may perform scheduling (allocating resources) using control channel information and pilot information, which communicate with the base station, and may perform inter-cell cooperative scheduling limited to the eNB from the sub-coordinator. For example, the scheduler may perform uplink cooperative scheduling by considering edge UEs in the boundary between sectors. In addition, the scheduler in each sector may download cooperative scheduling information of other eNBs from the CoMP-coordinator to thereby perform cooperative scheduling with respect to cells in other eNBs.

Figure 9:
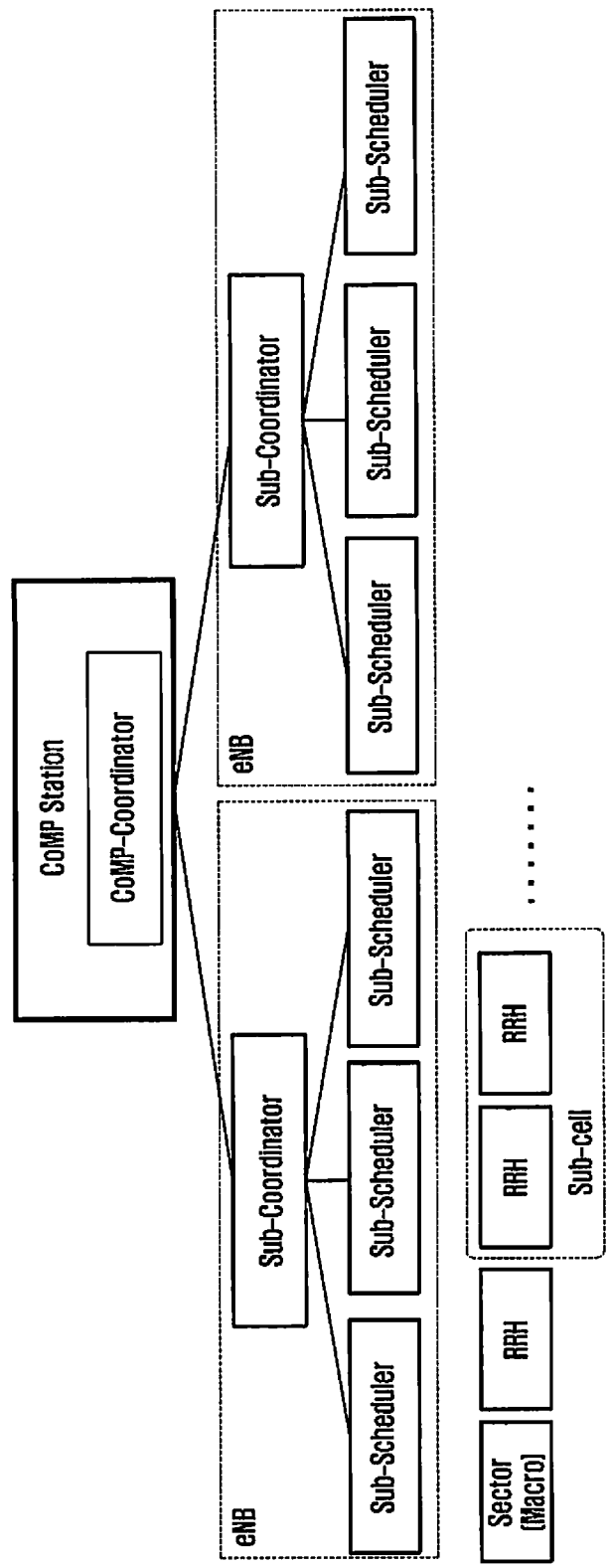
FIG. 9 is a diagram to explain an interface between base stations corresponding to CoMP scenarios 3 and 4.

FIG. 9 is a diagram to explain an interface between base stations corresponding to the CoMP scenarios 3 and 4. The CoMP scenario 3 is the inter-cell CoMP in heterogeneous deployment, and the CoMP scenario 4 means the distributed antenna system with shared cell ID.

As shown in FIG. 9, the present invention operates based on the structure comprised of a "sub-scheduler," a "sub-coordinator" that manages and controls "sub-scheduler," and a "CoMP-coordinator" that manages and controls the "sub-coordinator."

The "sub-scheduler" may receive the feedback of channel information (CQI, PMI, RI, and SRS) of the terminals that communicate in the cell coverage of the sub-cell area, and may determine control information (resource allocation information of PDCCH/PUCCH).

The sub-cell in the CoMP scenario 4 corresponding to the distributed antenna system (DAS) is comprised of a plurality of RRHs, or a plurality of RRHs and macro-cells. The sub-coordinator may perform the cooperative scheduling between the sub-cells, which are subordinate to the local eNB, and may make the relationship of master-slave with the CoMP-coordinator in the network, wherein the sub-coordinator corresponds to a slave.

The "CoMP-coordinator" corresponds to a master. When peripheral cooperative scheduling is conducted between the RRHs in the eNB, which are uploaded by the "sub-coordinator," the "CoMP-coordinator" may put together all pieces of inter-cell cooperative scheduling information of the plurality of "sub-coordinators" to provide the cooperative scheduling information between the sub-cells (RRHs) of the macro-cells.

The scheduler, which is subordinate to the sub-coordinator, may perform the scheduling (allocating resources) using the control channel information and the pilot information, which communicate with the base station, and may perform the inter-cell cooperative scheduling limited to the eNB from the sub-coordinator. For example, the scheduler may perform the uplink cooperative scheduling by considering the edge UEs in the boundary between the sectors. In addition, the scheduler in each sector may download the cooperative scheduling information of other eNBs from the CoMP-coordinator to thereby perform the cooperative scheduling with the cells in other eNBs.

According to the present invention, it is possible to operate the adaptive modulation and coding (AMC) scheme that can effectively compensate for the uplink modulation product coding rate (MPR) using the effective uplink MCS in the CoMP system. The detailed description thereof will be made with reference to the accompanying drawings later.

The present invention aims at the adaptive tracing of the SINR by estimating the interference of the cooperative cells, and according to the present invention, the MCS may be determined through four operations.

1) Estimating interference (cooperative cells/non-cooperative cells)

2) Estimating virtual_SINR

3) Estimating AMC_SINR value applied with outer-loop rate control (OLRC) offset based on Ack/Nack signal 4) Estimating MCS by mapping of SINR-to-MCS table based on estimated AMC_SINR value The First Operation: Estimating interference (cooperative cells/non-cooperative cells)

The interference from the cooperative cells may be calculated using the scheduling information of the cooperative cells and the SRS reception power.

$$\sum_{j \in \Phi} I_j^{Cooperation}(t, n),$$

where $\Phi$: cooperation set, $I_j^{Cooperation}(t,n)$: SRS reception power of UEj in tti t and RB n The interference from the non-cooperative cells may be calculated by IIR filtering the interference from the non-cooperative cells.

Sum of interference from non-cooperative cells in RB unit $$I^{Non\text{-}cooperation}(t, n) = \sum_{j \in \Theta} I_j^{Non\text{-}cooperation}(t, n) + N = \frac{S(t, n)}{SINR(t, n)} - \sum_{j \in \Phi} I_j^{Non\text{-}cooperation}(t, n)$$

where $$SINR(t, n) = \frac{S(t, n)}{\sum_{j \in \Phi} I_j^{Cooperation}(t, n) + \sum_{j \in \Theta} I_j^{Cooperation}(t, n) + N},$$

Average of sum of interference from non-cooperative cells in RB unit with respect to RB $$\bar{I}^{Non\text{-}cooperation}(t) = \frac{1}{|\Psi|} \sum_{n \in \Psi} I^{Non\text{-}cooperation}(t, n)$$

Interference of nth PUSCH RB in cell k at time t
$\Psi$: PUSCH RB area
Average with respect to time (I.I.R filtering)

$$\bar{I}^{Non\text{-}cooperation}(t+1) = (1-\alpha)\bar{I}^{Non\text{-}cooperation}(t) + \alpha I^{Non\text{-}cooperation}(t)$$

The Second Operation: Estimating virtual_SINR $$\text{Virtual\_SINR}(t, n) = \frac{S(t, n)}{\sum_{j \in \Phi} I_j^{Cooperation}(t, n) + \bar{I}^{Non\text{-}cooperation}(t)}$$

The Third Operation: Estimating AMC_SINR value applied with outer-loop rate control (OLRC) offset based on reply (Ack/Nack) signal In case of receiving Ack message $$\text{SINR\_Out} = \text{SINR\_in} + Offset_k, \qquad \text{Equation 3}$$

where SINR_in = Virtual_SINR,

-continued where $\textit{Offset}_k = \textit{Offset}_k + \text{Up}$, where $\text{Up} = \text{Down} \times \frac{\text{Target\_PER}}{1 - \text{Target\_PER}}$ In case of receiving Nack message $$\text{SINR\_Out} = \text{SINR\_in} + \textit{Offset}_k, \quad \text{Equation 4}$$

where $\text{SINR\_in} = \text{Virtual\_SINR}$, where $\textit{Offset}_k = \textit{Offset}_k - \text{Down}$, where $\text{Up} = \text{Down} \times \frac{\text{Target\_PER}}{1 - \text{Target\_PER}}$ The Fourth Operation: Estimating MCS by mapping of SINR-to-MCS table based on estimated AMC_SINR value FIG. 10a is a block diagram of a base station according to an embodiment of the present invention.

Figure 10A:
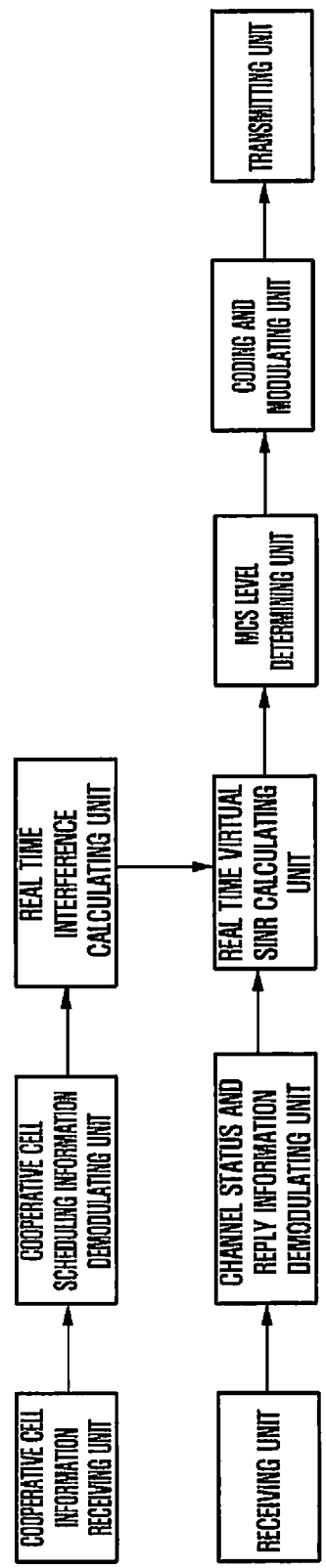
FIGS. 10a and 10b are block diagrams of a base station according to an embodiment of the present invention.

As shown in FIG. 10a, the base station, according to an embodiment of the present invention, may include a cooperative cell information receiving unit, a cooperative cell scheduling information demodulating unit, a real time interference calculating unit, a transmitting/receiving unit, a channel quality and reply information demodulating unit, a real time virtual SINR calculating unit, an MCS level determining unit, and a coding and modulating unit.

Particularly, the real time interference calculating unit may calculate the interference from the cooperative cells or the non-cooperative cells using the scheduling information of the neighboring cells. In addition, the real time virtual SINR calculating unit may calculate the real time virtual SINR using the interference and the uplink channel quality information.

Figure 10B:
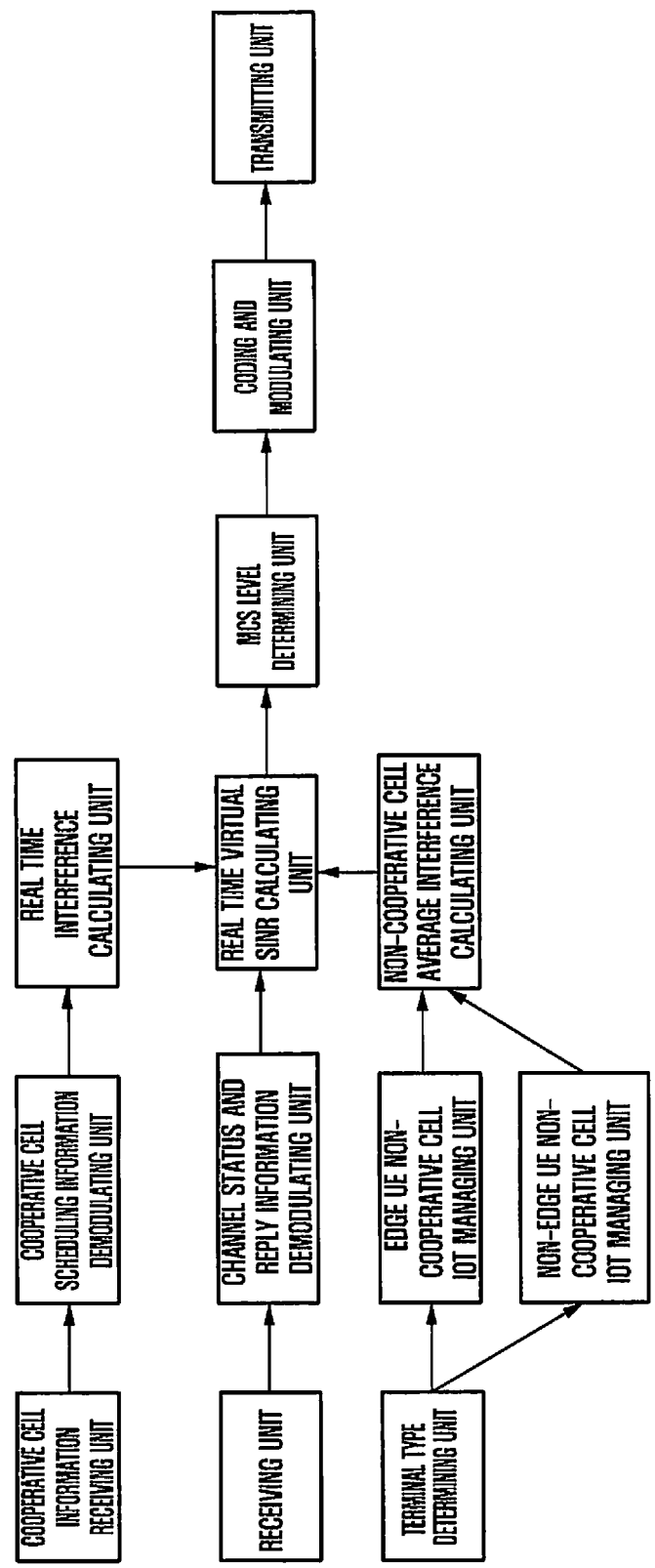

In addition to FIG. 10a, the base station of FIG. 10b may further include a terminal type determining unit, an edge terminal non-cooperative cell IoT managing unit, a non-edge terminal non-cooperative cell IoT managing unit, and a non-cooperative cell average interference calculating unit. The elements stem from the fact that the interference mode of the terminal, i.e., an edge UE or a non-edge UE, in each cell, which is defined in the cooperative scheduling, may be changed.

Since the change in the interference mode of the terminal may affect the amount of average interference of the non-cooperative cell defined in the virtual SINR of the cooperative AMC as well as the resource allocation of the scheduling, the base station of FIG. 10b includes additional blocks in order to reflect the same.

Meanwhile, the interference strength of the non-cooperative cell in each cell is determined according to the estimated amount of real time interference based on the scheduling information of the cooperative cell rather than the average interference value, so even though the interference mode of the terminal (the edge UE/the non-edge UE) is changed, there is no influence. However, if the average interference value or the interference mode of the terminal (the edge UE/the non-edge UE) is changed, the interference strength of the non-cooperative cell is to be altered.

$$\text{SINR} = S/(I\_\text{cooperative} + I\_\text{non-cooperative} + N),$$

where N is thermal noise, and I_cooperative is interference of the cooperative cells.

At this time, in the case where the cooperative cell scheduling is not performed as the prior art, "I_non-cooperative+N" to N is about 8.0 dB. However, when the cooperative cell scheduling is performed, "I_ non-cooperative+N" to N is about 4.2 dB in the edge mode of the terminal, and "I_non-cooperative+N" to N is about 8.3 dB in the non-edge mode of the terminal.

When the terminal is changed from the edge mode into the non-edge mode, the non-cooperative cell average interference calculating unit shown in FIG. 10b may change the I_non-cooperative value according to the same as well. Otherwise, the OLRC error abruptly increases due to the channel (SINR) estimation mismatch, to thereby cause the degradation of the MCS efficiency and the capacity loss of the terminal.

Figure 11:
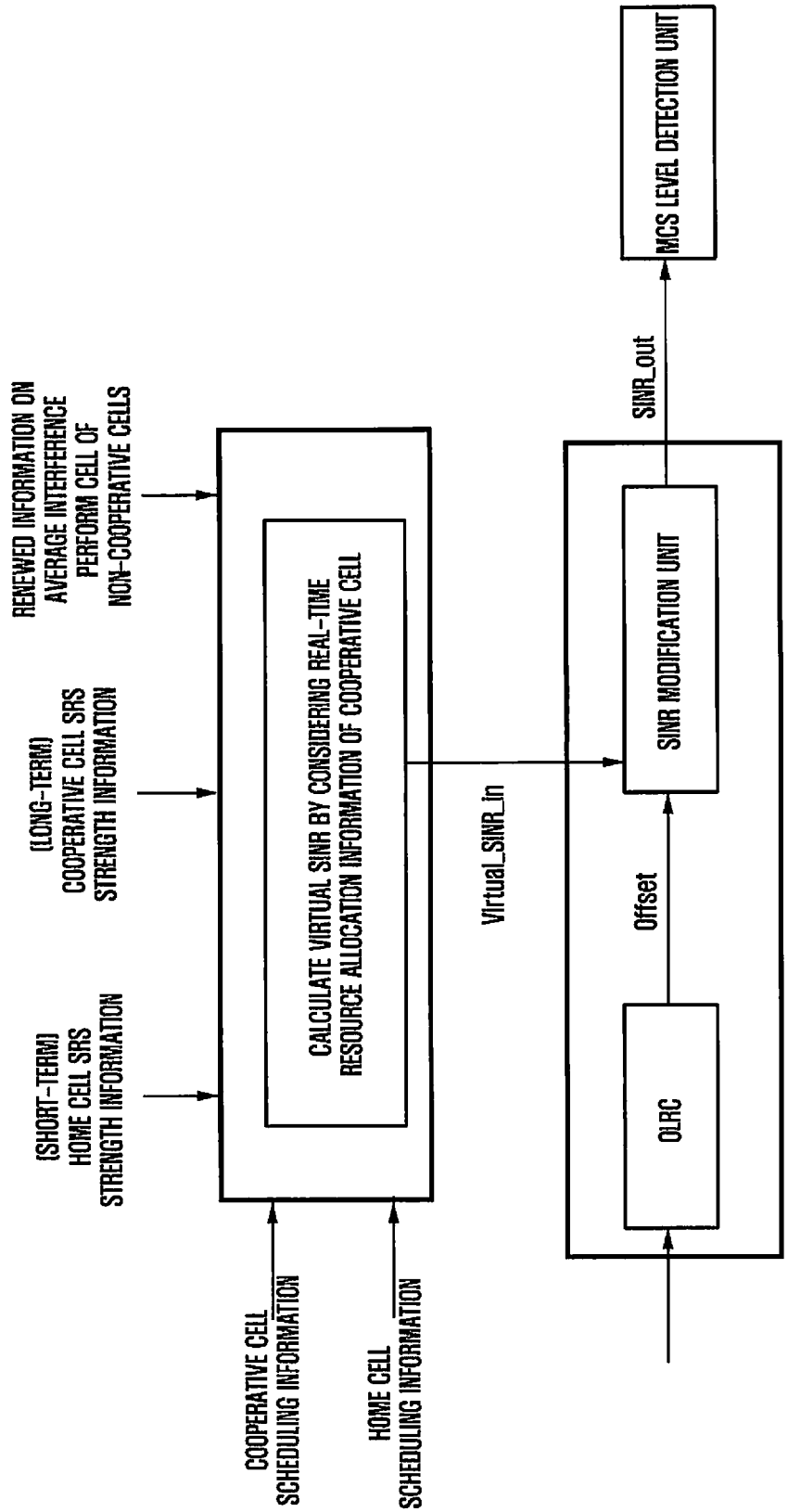
FIG. 11 is a block diagram of an MCS level determining unit included in the base station according to an embodiment of the present invention.

FIG. 11 is a block diagram of the MCS level determining unit included in the base station according to an embodiment of the present invention.

As shown in FIG. 11, the MCS level determining unit may perform the OLRC calculation on the basis of the real time virtual SINR and the Ack/Nack information, and may modify the SINR to thereby determine the MCS level.

Figure 12:
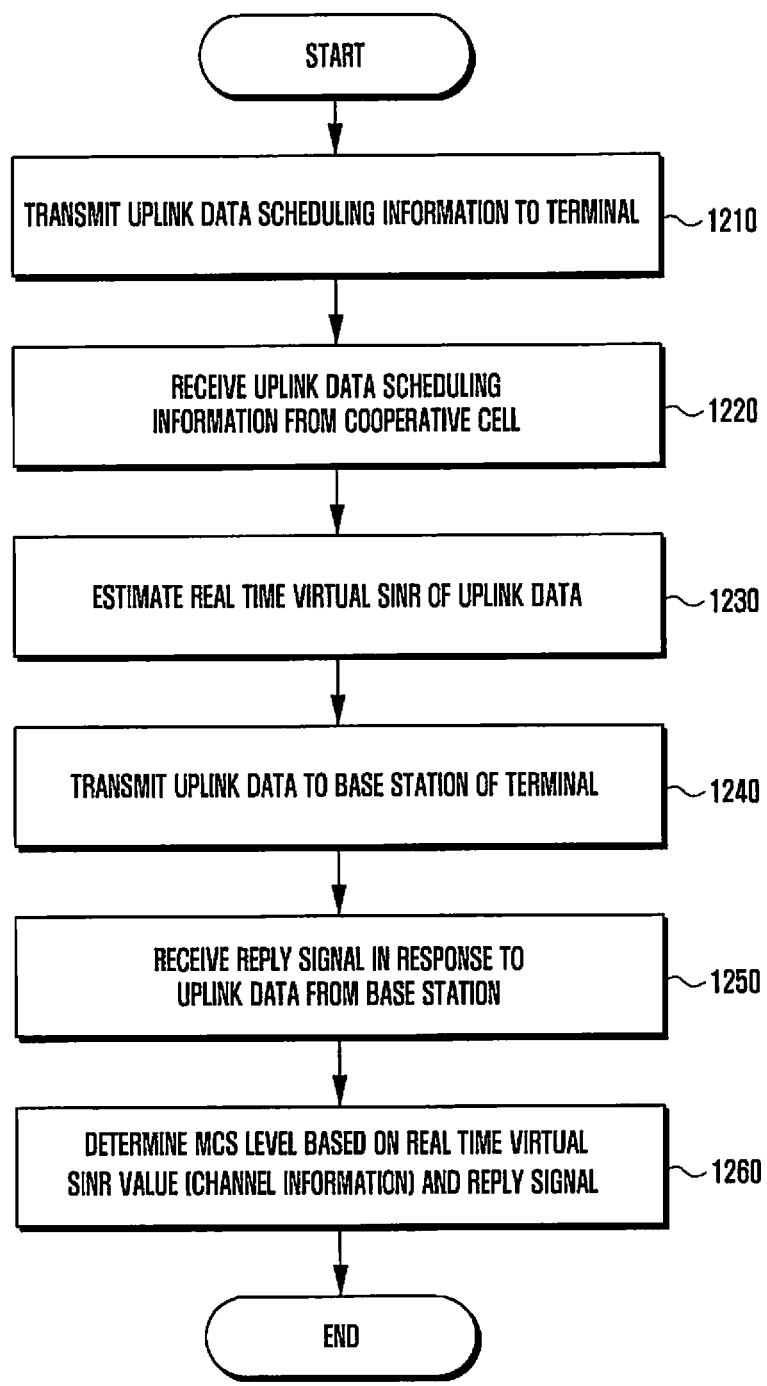
FIG. 12 is a flowchart illustrating the process of determining an MCS level in a base station according to an embodiment of the present invention.

FIG. 12 is a flowchart illustrating the process of determining the MCS level in the base station according to an embodiment of the present invention.

In operation 1210, the base station transmits the uplink data scheduling information to the terminal. In addition, in operation 1220, the base station receives the uplink data scheduling information from the cooperative cell.

Afterwards, the base station estimates the real time virtual SINR of the uplink data in operation 1230, and the base station receives the uplink data from the terminal in operation 1240. In operation 1250, the base station transmits the reply signal in response to the uplink data to the terminal.

Finally, in operation 1260, the base station may determine the MCS level on the basis of the virtual SINR value and the received reply signal.

Figure 13:
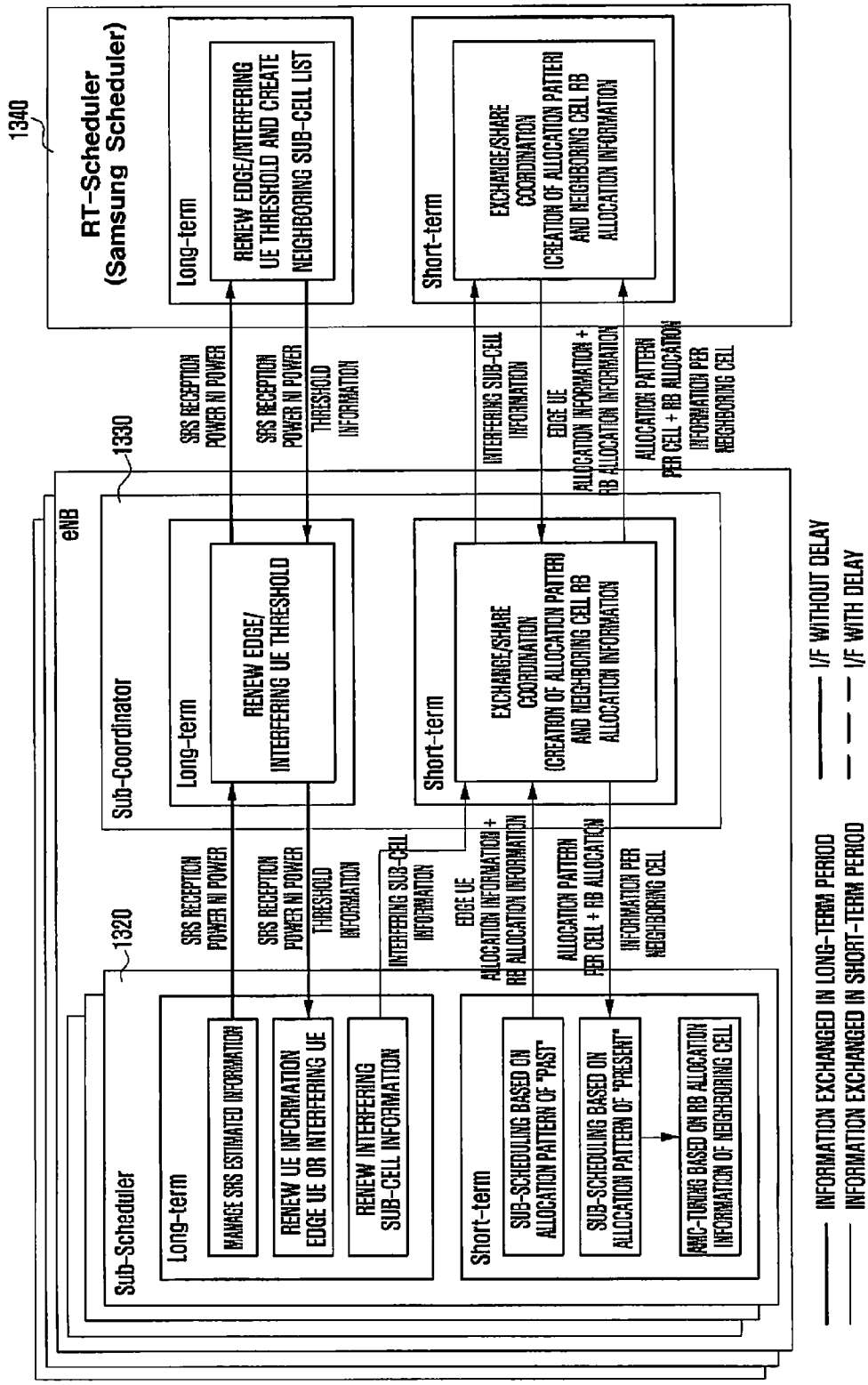
FIG. 13 is a structural diagram illustrating the interaction between a scheduler and a coordinator according to an embodiment of the present invention.

FIG. 13 is a structural diagram illustrating the interaction between a scheduler and a coordinator according to an embodiment of the present invention.

Referring to FIG. 13, the eNB 1310 may include the sub-scheduler 1320, and a sub-coordinator 1330. The sub-scheduler 1320 and the sub-coordinator 1330 may exchange information with each other in a long term period or in a short term period.

The operation of exchanging information in a long term period will be described.

First, the sub-coordinator (the slave) 1330 may transfer the SRS (the uplink RS) reception power received from the sub-scheduler 1320 to the CoMP-coordinator (the master) 1340, and at the same time, may determine edge/interfering UEs for each UE using the same.

Second, the CoMP-coordinator (the master) 1340 may calculate a reference threshold for determining the edge/interfering UEs using the SRS reception power received from the sub-coordinator 1330 to thereby transfer the same to the sub-coordinator 1330. In addition, the CoMP-coordinator (the master) 1340 may make a neighboring sub-cell list for each sub-cell, and may transfer the SRS reception power received according to each sub-cell in the neighboring sub-cell.

Third, the sub-coordinator (the slave) 1330 may receive the reference threshold for determining the edge/interfering UEs from the CoMP-coordinator (the master) 1340, and may renew UE information (information on whether UE is the edge UE or the interfering UE) to transfer the same to the sub-scheduler 1320. In the case of a malfunction of the CoMP-coordinator (the master) 1340, the sub-coordinator (the slave) 1330 may renew the UE information using only the SRS reception power received from the sub-scheduler 1320, and may transfer the same to the sub-scheduler 1320.

The operation of exchanging information in a short term period will be described.

First, the sub-scheduler 1320 may create cooperative sub-scheduling information with respect to a corresponding sub-cell (RRH), and may transfer edge UE allocation information (edge UE allocation ratio information) or PUCCH RB allocation information to the sub-coordinator 1330.

The sub-coordinator (the slave) 1330 may transfer the edge UE allocation information received from the sub-scheduler 1320 to the CoMP-coordinator (the master) 1340.

Afterwards, the CoMP-coordinator (the master) 1340 may create an allocation pattern (edge UE allocation ratio information) for all of the sub-cells, which are managed by the CoMP-coordinator (the master), using the edge UE allocation information received from the sub-coordinator 1330, and may transfer the same to the sub-coordinator (the slave) 1330.

Next, the sub-coordinator (the slave) 1330 may receive the allocation information from the sub-cells to thereby create an allocation pattern for all of the sub-cells in the sub-coordination group. In addition, the sub-coordinator 1330 may transfer the allocation pattern received from the CoMP-coordinator (the master) 1340 to each sub-scheduler. In the case of a malfunction of the CoMP-coordinator (the master), the sub-coordinator (the slave) may transfer the allocation pattern created by itself instead of the allocation pattern created by the CoMP-coordinator (the master) to each sub-scheduler.

In addition, the sub-scheduler may perform the sub-scheduling on the basis of the allocation pattern received from the sub-coordinator (the slave).

Those skilled in the art can appreciate that it is possible to implement the present invention in another specific form without changing the technical idea or the indispensable characteristics of the present invention. Accordingly, it should be understood that the embodiments described above are merely exemplary and are not limited. The scope of the present invention is defined by the appended claims to be described later, rather than the detailed description. Accordingly, it should be appreciated that all modifications or variations derived from the meaning and scope of the appended claims and their equivalents are included in the range of the present invention.

Although exemplary embodiments of the present invention have been shown and described in this specification and the drawings, they are used in general sense in order to easily explain technical contents of the present invention, and to help comprehension of the present invention, and are not intended to limit the scope of the present invention. It is obvious to those skilled in the art to which the present invention pertains that other modified embodiments on the basis of the spirits of the present invention besides the embodiments disclosed herein can be carried out.

The invention claimed is:

1. A method for a serving base station determining a modulation and coding selection (MCS) of a terminal in a wireless communication uplink system, the method comprising:

determining first uplink interference information from cooperative cells based on scheduling information of neighboring cells;

determining second uplink interference information from non-cooperative cells;

determining a virtual signal-to-interference plus noise ratio (SINR) information, based on a feedback signal indicating whether or not data transmitted by the terminal is received, the first uplink interference information, and an average value of the second uplink interference information; and determining the MCS, based on the virtual SINR information and the feedback signal.

2. The method as claimed in claim 1, wherein the first uplink interference information is determined based on the scheduling information of neighboring cells and sounding reference signal (SRS) reception power of the cooperative cells.

3. The method as claimed in claim 2, wherein the determining of of the second uplink interference information comprises:

determining a sum of the uplink interference from the non-cooperative cells in a resource block (RB) unit; and determining an average value of the sum of the uplink interference in a frequency unit and a time unit.

4. The method as claimed in claim 3, wherein the determining of the virtual SINR information comprises determining the virtual SINR information based on an outer-loop rate control (OLRC) offset using the reply signal.

5. The method as claimed in claim 4, wherein the determining of the MCS comprises determining the MCS by mapping the virtual SINR value with an SINR-to-MCS table.

6. A serving base station for determining a modulation and coding selection (MCS) of a terminal in a wireless communication uplink system, the base station comprising:

a transceiver configured to transmit/receive signals to/from neighboring cells; and a controller configured to:

determine first uplink interference information from cooperative cells based on scheduling information of neighboring cells;

determine second uplink interference information from non-cooperative cells;

determine a virtual signal-to-interference plus noise ratio (SINR) information, based on a feedback signal indicating whether or not data transmitted by the terminal is received, the first uplink interference information, and an average value of the second uplink interference information; and determine the MCS, based on the virtual SINR information and the feedback signal.

7. The base station as claimed in claim 6, wherein the controller is further configured to determine the first uplink interference information based on the scheduling information of neighboring cells and sounding reference signal (SRS) reception power of the cooperative cells.

8. The base station as claimed in claim 7, wherein the controller is further configured to determine a sum of the uplink interference from the non-cooperative cells in a resource block (RB) unit, and determine an average value of the sum of the uplink interference in a frequency unit and a time unit.

9. The base station as claimed in claim 8, wherein the controller is further configured to determine the virtual SINR information based on an outer-loop rate control (OLRC) offset using the reply signal.

10. The base station as claimed in claim 9, wherein the controller is further configured to determine the MCS by mapping the virtual SINR value with an SINR-to-MCS table.

* * * * *